(12) United States Patent
Savant et al.

(10) Patent No.: US 11,340,940 B2
(45) Date of Patent: May 24, 2022

(54) WORKLOAD ASSESSMENT AND CONFIGURATION SIMULATOR

(71) Applicant: Bank of America Corporation, Charlotte, NC (US)

(72) Inventors: Anuja Savant, Maharashtra (IN); Pramodh Siril Rao Chennamaneni, Telangana (IN); Sasidhar Purushothaman, Telangana (IN); Alla Piltser, Edison, NJ (US); Zaheeruddin Mohammed, Telangana (IN)

(73) Assignee: Bank of America Corporation, Charlotte, NC (US)

( * ) Notice: Subject to any disclaimer, the term of this patent is extended or adjusted under 35 U.S.C. 154(b) by 179 days.

(21) Appl. No.: 16/919,727

(22) Filed: Jul. 2, 2020

(65) Prior Publication Data
US 2022/0004427 A1  Jan. 6, 2022

(51) Int. Cl.
| | | |
|---|---|---|
| *G06F 9/48* | (2006.01) | |
| *G06F 9/50* | (2006.01) | |
| *G06F 11/30* | (2006.01) | |
| *G06F 11/34* | (2006.01) | |
| *G06F 9/445* | (2018.01) | |

(52) U.S. Cl.
CPC ........ *G06F 9/4856* (2013.01); *G06F 9/44505* (2013.01); *G06F 9/50* (2013.01); *G06F 11/302* (2013.01); *G06F 11/3495* (2013.01); *G06F 2209/482* (2013.01)

(58) Field of Classification Search
CPC .................................................... G06F 9/4856
See application file for complete search history.

(56) References Cited

U.S. PATENT DOCUMENTS

| | | |
|---|---|---|
| 7,865,888 B1 | 1/2011 | Qureshi et al. |
| 7,870,550 B1 | 1/2011 | Qureshi et al. |
| 8,175,863 B1 | 5/2012 | Ostermeyer et al. |
| 8,219,653 B1 | 7/2012 | Keagy et al. |
| 8,533,305 B1 | 9/2013 | Keagy et al. |
| 10,365,935 B1 | 7/2019 | Keagy et al. |

(Continued)

*Primary Examiner* — Charlie Sun
(74) *Attorney, Agent, or Firm* — Banner & Witcoff, Ltd.

(57) ABSTRACT

An application may be migrated from a first to a second computing system. Configuration parameter values associated with executing the migrated application on the second computing system may be determined by computational optimization based on configuration parameter values and/or monitored performance metrics associated with the application on the first computing system. Configuration parameter values associated with executing the migrated application on the second computing system may be determined by performing simulations of the migrated application configured for execution on the second computing system based on multiple sets of configuration parameter values, monitoring performance metrics associated with the simulations, and performing computational optimization based on the multiple sets of configuration parameter values and monitored performance metrics associated with the simulations. Configuration parameter values associated with executing the migrated application on the second computing system may be updated based on monitored performance metrics associated with executing the migrated application.

20 Claims, 3 Drawing Sheets

(56) References Cited

U.S. PATENT DOCUMENTS

2010/0281482 A1* 11/2010 Pike ..................... G06F 9/5044
                                                        718/102
2017/0373935 A1* 12/2017 Subramanian ........ G06F 9/5072

* cited by examiner

WORKLOAD ASSESSMENT AND CONFIGURATION SIMULATOR

FIELD

Aspects described herein generally relate to computer systems and networks. More specifically, aspects of this disclosure relate to workload assessment and configuration simulation.

BACKGROUND

Client-server computing systems and enterprise software applications are typically designed to operate according to various adjustable configuration settings. The configuration settings typically control operational aspects such as maximum number of permitted simultaneous users, maximum permissible file size acceptable as input, or values of the outer limits of permissible ranges for various variables or parameters.

SUMMARY

Aspects of the disclosure may provide solutions that address and overcome technical problems associated with migrating enterprise software applications from a first computing system environment to a second computing system environment. One or more aspects of the disclosure may relate to determining one or more preferred configuration settings for an enterprise application executing in the first computing system environment and also corresponding one or more preferred configuration settings for a migrated version of the enterprise application executing in the second computing system environment.

Enterprise software applications deployed in a first computing system environment, for example, a private client-server system including one or more computing servers, may be migrated to a second computing system environment, for example, a cloud computing system or third-party hosted client-server system. The migrating may be performed by recompiling source code designed for the first computing system environment to be deployed in the second computing system environment. The recompiling may be performed using a code compiler, object code library, and related tools and/or associated files associated with generating executable code for the second computing system environment. For interpreted computer languages and/or scripts, the compiling may be replaced with source code editing. Differences in the second computing system environment compared to the first computing system environment may be accounted for by making changes in the source code designed for the first computing system environment to conform to requirements of the second computing system environment before being recompiled and/or edited to be migrated and deployed in the second computing system environment.

Traditionally, configuration settings may be left in a default state when migrating the application. In accordance with one or more arrangements, as discussed herein, inter-dependencies between configuration settings for the application, relationships between configuration settings and the computing system environment on which the application executes, and impacts of configuration settings upon application and/or computing system environment performance may be evaluated to determine modifications and/or improvements to configuration settings for the application and/or associated host computing system environment based on the application being migrated to the second computing system environment.

The configuration settings may be initially chosen according to values that have been demonstrated or are anticipated to produce desirable performance results. Various performance results of client-server computing systems and enterprise software applications may be measured to verify acceptable operation in practice. Configuration settings associated with the application deployed in the first computing system environment may be re-evaluated in the context of the migrated application to be deployed in the second computing system environment. The re-evaluation of the configuration settings may include performing simulations and analyses to determine changes to the configuration settings to accompany the migration of the application. The changes to the configuration settings may be determined to provide equivalent and/or better performance in the second computing system environment compared to the configuration settings associated with the application deployed in the first computing system environment.

BRIEF DESCRIPTION OF THE DRAWINGS

The present disclosure is illustrated by way of example and not limited in the accompanying figures in which like reference numerals indicate similar elements and in which.

DETAILED DESCRIPTION

Figure 1A:
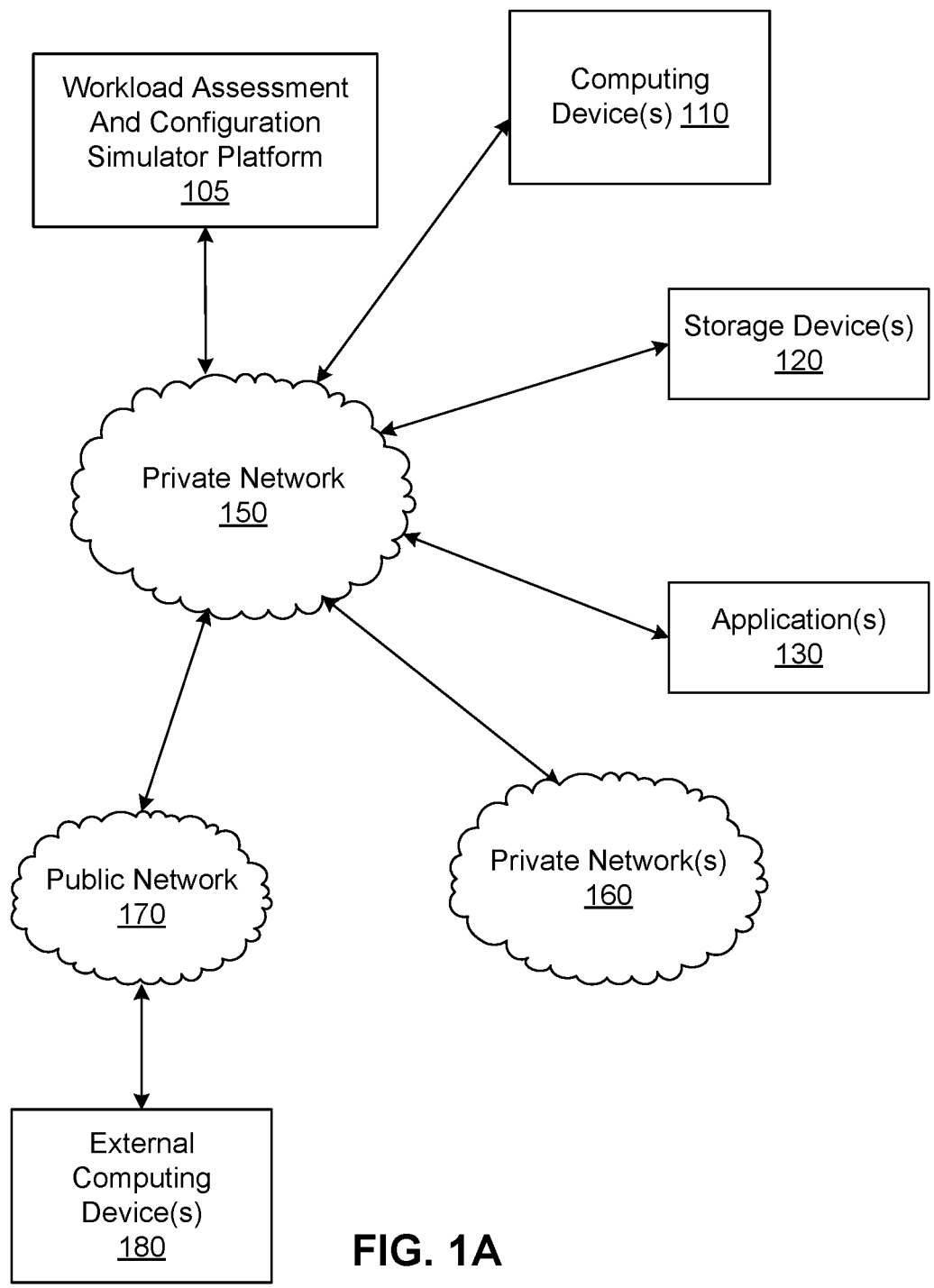
FIGS. 1A and 1B depict an illustrative computing environment for workload assessment and orchestration of configuration settings for migrating executable applications, in accordance with one or more example arrangements.

In the following description of various illustrative arrangements, reference is made to the accompanying drawings, which form a part hereof, and in which is shown, by way of illustration, various arrangements in which aspects of the disclosure may be practiced. It is to be understood that other arrangements may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

Various aspects of this disclosure relate to devices, systems, and methods for workload assessment and configuration simulation for executable applications migrating from a first computing system environment (e.g., a private server for a client-server system) to a second computing system environment (e.g., a third-party hosted cloud server for a client-server system). An entity (e.g., a computing device, a private computing network, an enterprise organization, a multi-platform computing network, etc.) may be associated with an executable application deployed for execution and access by users via a first computing system environment, for example, including one or more private computing system environments. The entity may migrate the executable application to a second computing system environment, for example, including one or more third-party hosted cloud servers for a client-server system. The first computing system environment and/or the second computing system environment may include one or more of a web server, an application server, a database server, an encryption device, a storage device, or a file server.

The entity may perform the migration of the executable application based on an expectation of various benefits, for example, increased processing speeds, greater throughput, ability to handle more simultaneous users or user requests, and/or straightforward scalability as the number of users increases or decreases. The scalability benefits may include meeting dynamically changing computing capabilities requirements without requiring dedicated resources to meet the maximum peak performance requirements at all times, although the maximum peak performance may only be infrequently required. Although code (e.g., computer source code written in a computer programming language such as COBOL, FORTRAN, C++, etc.) for the executable application may have been modified to target the second computing system environment and/or recompiled with libraries targeted toward the second computing system environment, these modifications may not capture or reflect all of the operational and/or environment differences of the second computing system environment compared to the first computing system environment.

Typically, the various application and/or computing system configuration settings of the first computing system environment may simply be copied and adopted by the newly migrated executable application and/or second computing system environment. The configuration settings may include a quantity of workload processes that may be executed simultaneously, a quantity of operations per second that may be performed by the computing system environment, a quantity of memory addresses that may be allocated to one or more processes executed by the computing system environment, or others. An ideal set of application and/or computing system configuration settings for the migrated executable application and/or second computing system environment has traditionally not been determined due to an absence of predictive information pertaining to the computational requirements, operational behavior, and performance of the migrated executable application and/or second computing system environment after the migration is completed. Configuration setting values copied from the first computing system environment to the migrated executable application and/or second computing system environment may not yield acceptable performance by the migrated executable application and/or second computing system environment due to varying computational requirements, operational behavior, and/or performance of the migrated executable application and/or second computing system environment compared to the original executable application and/or first computing system environment.

The second computing system environment may have one or more performance characteristics different than corresponding characteristics of the first computing system environment. These differences in characteristics may lead to unexpected performance problems associated with the simple adoption of the configuration settings for the migrated executable application based on the first computing system environment. These unexpected performance problems may appear after a period of time after initial launch of the migrated executable application on the second computing system environment, for example, one or more days, weeks, or months. Therefore, simply copying and adopting the various application and/or computing system configuration settings of the first computing system environment by the newly migrated executable application and/or second computing system environment may not yield the various benefits expected by the migration and/or may introduce unexpected problems.

For example, the migrated executable application may be unable to effectively process a certain quantity (e.g., 15, 50, or other quantity) of simultaneous users or user requests at a given time based on a default set of configuration parameter settings, whereas the original executable application executing on the first computing system environment may not have had problems processing the same certain quantity of simultaneous users or user requests at a given time based on the default set of configuration parameter settings. Performance issues arising in the migrated executable application on the second computing system environment may be due to one or more servers of the second computing system environment not being configured optimally. Configuration parameters set for the original executable application on the first computing system environment simply being copied over to the migrated executable application on the second computing system environment without a new analysis based on the actual second computing system environment and/or software deployed thereon may lead to the introduction of the performance issues and/or operational problems and errors. This may be due to a naïve expectation that in a cloud computing model featuring the second computing system environment, memory and/or computational capacity is unlimited due to scalability and that the migrated executable application won't fail in the cloud computing model due to elasticity of the cloud computing environment. However, performance may be dependent upon configuration settings for the executable application in addition to configuration settings for the second computing system environment on which the migrated executable application executes.

Arrangements discussed herein may address the aforementioned issues by customizing application and/or computing system configuration parameters based on monitoring performance of the executable application in the first computing system environment in relation to one or more configuration settings for the executable application and/or the first computing system environment. The aforementioned issues may be addressed by customizing application and/or computing system configuration parameters based on monitoring performance of the executable application in the second computing system environment in relation to one or more configuration settings for the executable application and/or the first computing system environment. The customizing application and/or computing system configuration parameters may be based on simulations of the migrated executable application on the second computing system environment. The customizing application and/or computing system configuration parameters may comprise determining optimal configuration parameter values and/or ranges of preferred and/or acceptable configuration parameters. Computational optimization, for example, multidimensional optimization, polynomial optimization, artificial intelligence, and/or machine learning techniques may be used to determine best configuration setting values and/or value ranges based on designated target performance metrics, based on the monitored performance of the executable application in the first computing system environment, based on simulations of the migrated executable application on the second computing system environment, and/or based on the monitored performance of the migrated executable application in the second computing system environment.

Ongoing adjustments to configuration setting values may be determined based on ongoing monitoring of performance metrics of the deployed migrated executable application and/or second computing system environment. The monitoring may be in relation to one or more configuration settings for the executable application and/or the second computing system environment. The ongoing adjustments to configuration setting values may also be based on simulations of the migrated application on the second computing system environment. The ongoing adjustments to configuration setting values may comprise determining optimal configuration parameter values and/or ranges of preferred and/or acceptable application and/or computing system configuration parameters. The ongoing adjustments to configuration setting values may comprise determining interdependencies of the various configuration parameters and settings. Multidimensional optimization, polynomial optimization, artificial intelligence, and/or machine learning techniques may be used to determine best configuration setting values and/or value ranges based on designated target performance metrics, based on interdependencies of the configuration parameters and settings, and/or based on the monitored performance of the migrated executable application and/or the second computing system environment.

Ongoing monitoring and evaluation of the migrated executable application and/or the second computing system environment hosting the migrated executable application may comprise monitoring, logging, and/or analyzing real-time/runtime configuration parameter settings, values, and/or real-time/runtime performance metrics. Logged real-time/runtime data may be validated against defined policies and/or templates. Deviations from acceptable values and ranges may be flagged to notify an administrative function of the deviations, initiate an analysis, and/or initiate a determination of one or more corrective actions that may be taken to bring the performance metrics back into conformance with the policies and/or templates.

Policies and templates may comprise: standard definitions of configuration parameters and/or performance metrics; ideal, upper, and/or lower bound values for the configuration parameters and/or performance metrics; and/or one or more standard combinations of settings and values for the configuration parameters and/or performance metrics upon which operation of the executable application may be based.

Figure 1B:
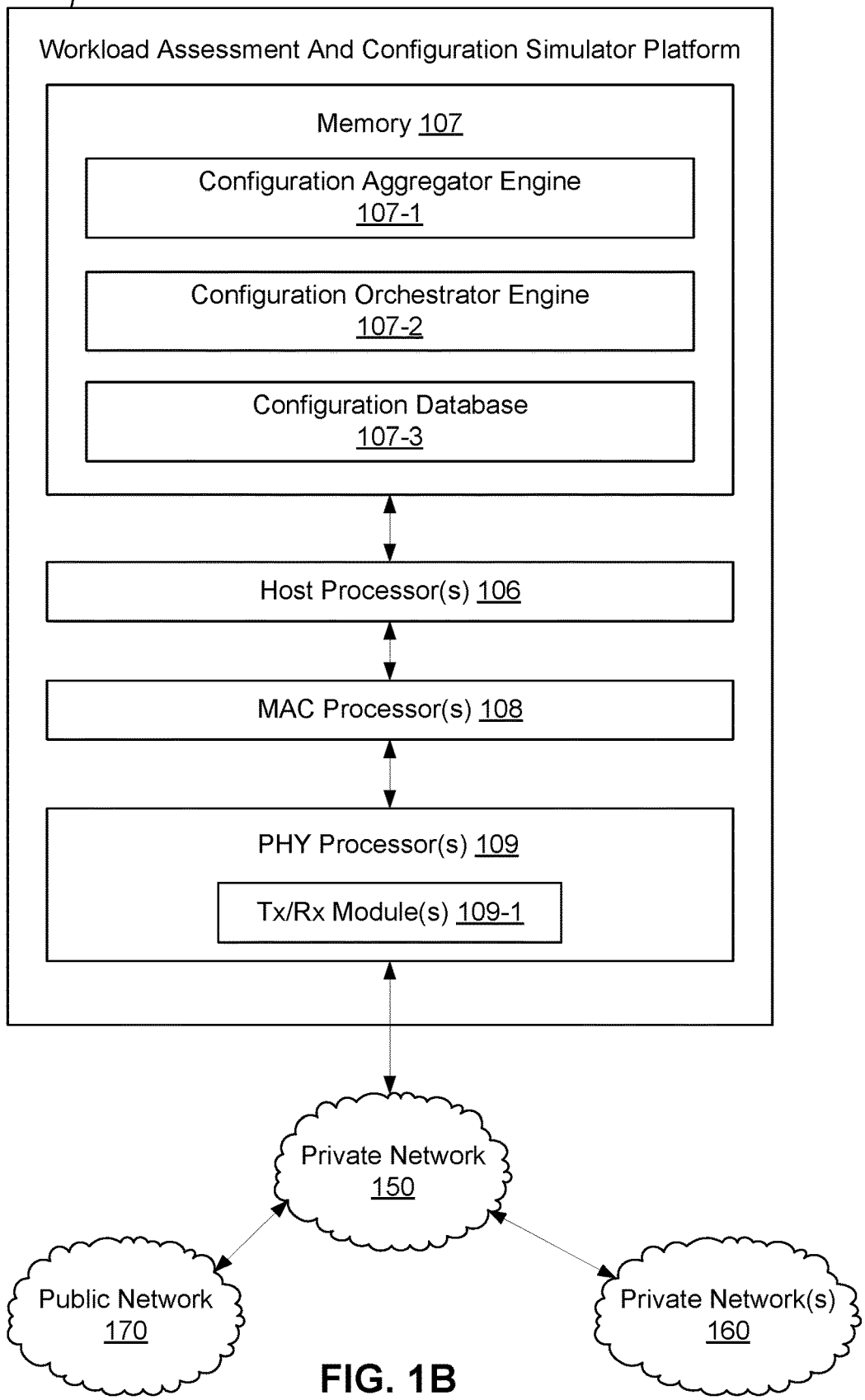

FIGS. 1A and 1B depict an illustrative computing environment for workload assessment and orchestration of configuration settings for migrating executable applications, in accordance with one or more example arrangements. Referring to FIG. 1A, a computing environment 100 may comprise one or more devices (e.g., computer systems, communication devices, servers). The computing environment 100 may comprise, for example, a workload assessment and configuration simulator platform 105, one or more computing device(s) 110, and one or more storage device(s) 120 linked over a private network 150. The storage device(s) 120 may comprise a database, for example, a relational database (e.g., Relational Database Management System (RDBMS), Structured Query Language (SQL), etc.). One or more application(s) 130 may operate on one or more computing devices or servers associated with the private network 150. The private network 150 may comprise an enterprise private network, for example.

The computing environment 100 may comprise one or more networks (e.g., public networks and/or private networks), which may interconnect one or more of the workload assessment and configuration simulator platform 105, the computing device(s) 110, the storage device(s) 120, and/or one or more other devices and computing servers. One or more applications 130 may operate on one or more devices in the computing environment 100. The networks may use wired and/or wireless communication protocols. The private network 150 may be associated with, for example, an enterprise organization. The private network 150 may interconnect the workload assessment and configuration simulator platform 105, the computing device(s) 110, the storage device(s) 120, and/or one or more other devices/servers which may be associated with the enterprise organization. The private network 150 may be linked to one or more other private network(s) 160 and/or a public network 170. The public network 170 may comprise the Internet and/or a cloud network. The private network 150 and the private network(s) 160 may correspond to, for example, a local area network (LAN), a wide area network (WAN), a peer-to-peer network, or the like.

A user in a context of the computing environment 100 may be, for example, an associated user (e.g., an employee, an affiliate, or the like) of the enterprise organization. An external user (e.g., a client) may utilize services being provided by the enterprise organization, and access one or more resources located within the private network 150 (e.g., via the public network 170). One or more users may operate one or more devices in the computing environment 100 to send messages to and/or receive messages from one or more other devices connected to or communicatively coupled with the computing environment 100. The enterprise organization may correspond to any government or private institution, an educational institution, a financial institution, a health services provider, a retailer, or the like.

As illustrated in greater detail below, the workload assessment and configuration simulator platform 105 may comprise one or more computing devices configured to perform one or more of the functions described herein. The workload assessment and configuration simulator platform 105 may comprise, for example, one or more computers (e.g., laptop computers, desktop computers, computing servers, server blades, or the like).

The computing device(s) 110 may comprise one or more of an enterprise application host platform, an enterprise user computing device, an administrator computing device, and/or other computing devices, platforms, and servers associated with the private network 150. The enterprise application host platform(s) may comprise one or more computing devices and/or other computer components (e.g., processors, memories, communication interfaces). The enterprise application host platform may be configured to host, execute, and/or otherwise provide one or more enterprise applications. The enterprise application host platform(s) may be configured, for example, to host, execute, and/or otherwise provide one or more transaction processing programs, user servicing programs, and/or other programs associated with an enterprise organization. The enterprise application host platform(s) may be configured to provide various enterprise and/or back-office computing functions for an enterprise organization. The enterprise application host platform(s) may comprise various servers and/or databases that store and/or otherwise maintain account information, such as financial/membership account information including account balances, transaction history, account owner information, and/or other information corresponding to one or more users (e.g., external users). The enterprise application host platform(s) may process and/or otherwise execute transactions on specific accounts based on commands and/or other information received from other computer systems comprising the computing environment 100. The enterprise application host platform(s) may receive data from the workload assessment and configuration simulator platform 105, manipulate and/or otherwise process such data, and/or return processed data and/or other data to the workload assessment and configuration simulator platform 105 and/or to other computer systems in the computing environment 100.

The enterprise user computing device may comprise a personal computing device (e.g., desktop computer, laptop computer) or mobile computing device (e.g., smartphone, tablet). The enterprise user computing device may be linked to and/or operated by a specific enterprise user (e.g., an employee or other affiliate of an enterprise organization).

The administrator computing device may comprise a personal computing device (e.g., desktop computer, laptop computer) or mobile computing device (e.g., smartphone, tablet). The administrator computing device may be linked to and/or operated by an administrative user (e.g., a network administrator of an enterprise organization). The administrator computing device may receive data from the workload assessment and configuration simulator platform 105, manipulate and/or otherwise process such data, and/or return processed data and/or other data to the workload assessment and configuration simulator platform 105 and/or to other computer systems in the computing environment 100. The administrator computing device may be configured to control operation of the workload assessment and configuration simulator platform 105.

The application(s) 130 may comprise transaction processing programs, user servicing programs, and/or other programs associated with an enterprise organization. The application(s) 130 may correspond to applications that provide various enterprise and/or back-office computing functions for an enterprise organization. The application(s) 130 may correspond to applications that facilitate storage, modification, and/or maintenance of account information, such as financial/membership account information including account balances, transaction history, account owner information, and/or other information corresponding to one or more users (e.g., external users). The application(s) 130 may process and/or otherwise execute transactions on specific accounts based on commands and/or other information received from other computer systems comprising the computing environment 100. The application(s) 130 may operate in a distributed manner across multiple computing devices (e.g., the computing device(s) 110) and/or servers, operate on a single computing device and/or server. The application(s) 130 may be used for execution of various operations corresponding to the one or more computing devices (e.g., the computing device(s) 110) and/or servers.

The storage device(s) 120 may comprise various memory devices such as hard disk drives, solid state drives, magnetic tape drives, or other electronically readable memory, and/or the like. The storage device(s) 120 may be used to store data corresponding to operation of one or more applications within the private network 150 (e.g., the application(s) 130), and/or computing devices (e.g., the computing device(s) 110). The storage device(s) 120 may receive data from the workload assessment and configuration simulator platform 105, store the data, and/or transmit the data to the workload assessment and configuration simulator platform 105 and/or to other computing systems in the computing environment 100.

The private network(s) 160 may have an architecture similar to an architecture of the private network 150. The private network(s) 160 may correspond to, for example, another enterprise organization that communicates data with the private network 150. The private network 150 may also be linked to the public network 170. The public network 170 may comprise the external computing device(s) 180. The external computer device(s) 180 may include a personal computing device (e.g., desktop computer, laptop computer) and/or a mobile computing device (e.g., smartphone, tablet). The external computing device(s) 180 may be linked to and/or operated by a user (e.g., a client, an affiliate, or an employee) of an enterprise organization associated with the private network 150. The user may interact with one or more enterprise resources while using the external computing device(s) 180 located outside of an enterprise firewall.

The workload assessment and configuration simulator platform 105, the computing device(s) 110, the external computing device(s) 180, and/or one or more other systems/devices in the computing environment 100 may comprise any type of computing device capable of receiving input via a user interface, and may communicate the received input to one or more other computing devices. The workload assessment and configuration simulator platform 105, the computing device(s) 110, the external computing device(s) 180, and/or the other systems/devices in the computing environment 100 may, in some instances, comprise server computers, desktop computers, laptop computers, tablet computers, smart phones, wearable devices, or the like that in turn comprise one or more processors, memories, communication interfaces, storage devices, and/or other components. Any and/or all of the workload assessment and configuration simulator platform 105, the computing device(s) 110, the storage device(s) 120, and/or other systems/devices in the computing environment 100 may be, in some instances, special-purpose computing devices configured to perform specific functions.

Referring to FIG. 1B, the workload assessment and configuration simulator platform 105 may comprise one or more of host processor(s) 106, memory 107, medium access control (MAC) processor(s) 108, physical layer (PHY) processor(s) 109, transmit/receive (Tx/Rx) module(s) 109-1, or the like. One or more data buses may interconnect host processor(s) 106, memory 107, MAC processor(s) 108, PHY processor(s) 109, and/or Tx/Rx module(s) 109-1. The workload assessment and configuration simulator platform 105 may be implemented using one or more integrated circuits (ICs), software, or a combination thereof, configured to operate as discussed below. The host processor(s) 106, the MAC processor(s) 108, and the PHY processor(s) 109 may be implemented, at least partially, on a single IC or multiple ICs. Memory 107 may be any memory such as a random-access memory (RAM), a read-only memory (ROM), a flash memory, or any other electronically readable memory, or the like.

Messages transmitted from and received at devices in the computing environment 100 may be encoded in one or more MAC data units and/or PHY data units. The MAC processor(s) 108 and/or the PHY processor(s) 109 of the workload assessment and configuration simulator platform 105 may be configured to generate data units, and process received data units, that conform to any suitable wired and/or wireless communication protocol. For example, the MAC processor(s) 108 may be configured to implement MAC layer functions, and the PHY processor(s) 109 may be configured to implement PHY layer functions corresponding to the communication protocol. The MAC processor(s) 108 may, for example, generate MAC data units (e.g., MAC protocol data units (MPDUs)), and forward the MAC data units to the PHY processor(s) 109. The PHY processor(s) 109 may, for example, generate PHY data units (e.g., PHY protocol data units (PPDUs)) based on the MAC layer data units. The generated PHY data units may be transmitted via the Tx/Rx module(s) 109-1 over the private network 150, the private network(s) 160, and/or the public network 170. Similarly, the PHY processor(s) 109 may receive PHY data units from the Tx/Rx module(s) 109-1, extract MAC layer data units encapsulated within the PHY data units, and forward the extracted MAC data units to the MAC processor(s). The MAC processor(s) 108 may then process the MAC data units as forwarded by the PHY processor(s) 109.

One or more processors (e.g., the host processor(s) 106, the MAC processor(s) 108, the PHY processor(s) 109, and/or the like) of the workload assessment and configuration simulator platform 105 may be configured to execute machine readable instructions stored in memory 107. Memory 107 may comprise (i) one or more program modules/engines having instructions that when executed by the one or more processors cause the workload assessment and configuration simulator platform 105 to perform one or more functions described herein, and/or (ii) one or more databases that may store and/or otherwise maintain information which may be used by the one or more program modules/engines and/or the one or more processors. The one or more program modules/engines and/or databases may be stored by and/or maintained in different memory units of the workload assessment and configuration simulator platform 105 and/or by different computing devices that may form and/or otherwise make up the workload assessment and configuration simulator platform 105. For example, memory 107 may have, store, and/or comprise a configuration aggregator engine 107-1, a configuration orchestrator engine 107-2, and/or a configuration database 107-3. The configuration aggregator engine 107-1 and the configuration orchestrator engine 107-2 may comprise instructions that direct and/or cause the workload assessment and configuration simulator platform 105 to perform one or more operations, as discussed in greater detail below. The configuration database 107-3 may comprise, for example, a relational database (e.g., Relational Database Management System (RDBMS), Structured Query Language (SQL) database, etc.) The configuration database 107-3 may store policies and configuration information pertaining to one or more applications 130 being assessed and configured by the workload assessment and configuration simulator platform 105 for migrating from a first computing system to a second computing system. The configuration database 107-3 may also store user information and/or administrator information corresponding to users and/or administrators, respectively, operating within the computing environment 100. The configuration database 107-3 may also store other information to be used for migration of one or more applications 130 to the second computing system. The configuration database 107-3 may be utilized by the host processor(s) 106 to store and analyze performance data of the components and software within the computing environment 100 in relation with configuration parameter settings as discussed in greater detail below. The configuration database 107-3 may be updated based on training messages and other messages, as discussed in greater detail below.

While FIG. 1A illustrates the workload assessment and configuration simulator platform 105 as being separate from other elements connected in the private network 150, in one or more other arrangements, the workload assessment and configuration simulator platform 105 may be included in one or more of the computing device(s) 110, and/or other device/ servers associated with the private network 150. Elements in the workload assessment and configuration simulator platform 105 (e.g., host processor(s) 106, memory(s) 107, MAC processor(s) 108, PHY processor(s) 109, and Tx/Rx module(s) 109-1, one or more program modules and/or stored in memory(s) 107) may share hardware and/or software elements with and corresponding to, for example, one or more of the computing device(s) 110, and/or other device/ servers associated with the private network 150.

Figure 2:
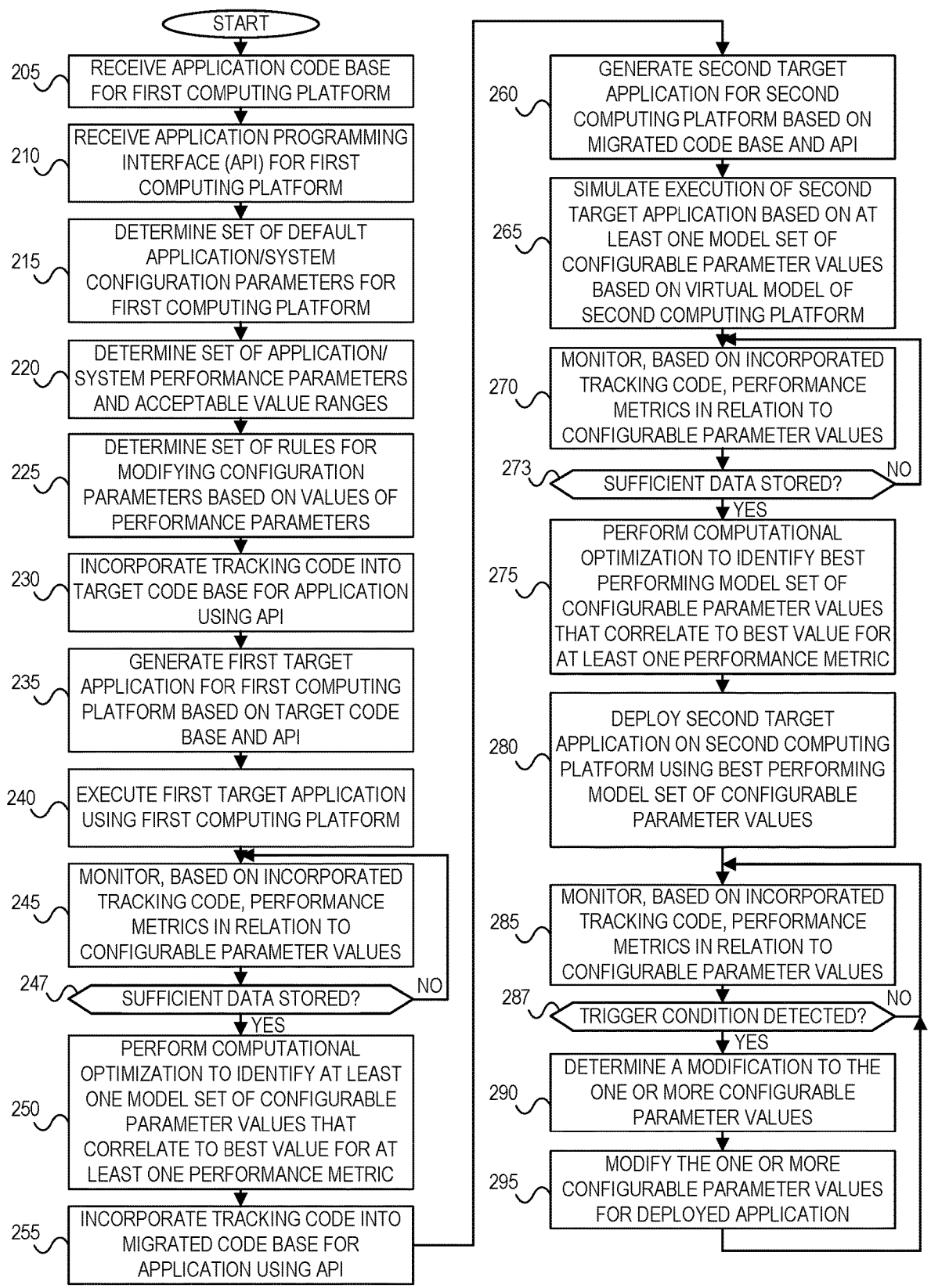
FIG. 2 depicts a process flow for performing workload assessment and configuration simulation for an executable application migrating from a first computing system environment to a second computing system environment, in accordance with one or more example arrangements.

FIG. 2 depicts a process flow for performing a workload assessment and configuration simulation for an executable application migrating from a first computing system environment to a second computing system environment, in accordance with one or more example arrangements. The process flow is described with reference to the computing environment 100 merely as an example. In other arrangements, the illustrative process flow may occur in a computing environment different from the computing environment 100. The illustrative process flow may be executed, for example, by the workload assessment and configuration simulator platform 105.

At block 205, the workload assessment and configuration simulator platform 105 may receive an application code base for a first computing system environment. The application code base may include source code written in a computer programming language, for example, COBOL, FORTRAN, C++, etc., capable of being compiled into an executable application. The application code base may include precompiled object code that may be linked with other object code to form an executable application. The application code base may include source code for an interpreted computer programming language or script language, for example, BASIC or Perl.

At block 210, the workload assessment and configuration simulator platform 105 may receive an application programming interface (API) for a set of tracking code for the first computing system environment. The API may include commands and/or functions for tracking and/or logging various configuration settings, performance metrics, and/or events associated with execution of an executable application with which the API is associated. The various tracked performance metrics and/or events may correspond to one or more layers of an Open Systems Interconnection (OSI) model and/or OSI protocol stack. The various tracked performance metrics and/or events may correspond to one or more of a runtime execution of the executable application, one or more other applications with which the executable application interfaces and/or communicates, one or more middleware programs, data layer communications, operating system (OS) layer communications, virtualization processes, bare metal communications, storage communications, and/or networking layer communications. The APIs may be configured to monitor runtime behavior of each layer of the OSI stack associated with the executable application. The APIs may be associated with policies, scripts, and/or template patterns for performing the tracking and/or logging of the various configuration settings, performance metrics, and/or events. The policies, scripts, and/or template patterns may specify the performance metrics and/or configuration parameter values and/or at what times they are to be monitored and/or logged.

At block 215, the workload assessment and configuration simulator platform 105 may determine a set of default application and/or system environment configurable parameter values for the first computing system environment on which the application executes. The defaults may be specified by one or more policies, scripts, and/or template patterns.

At block 220, the workload assessment and configuration simulator platform 105 may determine a set of application and/or system environment performance metrics and acceptable value ranges. The set of performance metrics and/or acceptable value ranges may be specified by one or more policies, scripts, and/or template patterns.

At block 225, the workload assessment and configuration simulator platform 105 may determine a set of rules for modifying configurable parameter values based on values of performance metrics. The rules may be specified by one or more policies, scripts, and/or template patterns.

At block 230, the workload assessment and configuration simulator platform 105 may incorporate at least a first portion of a tracking code base into a target code base. The tracking code base may include features to output performance metrics to performance logs and/or input configuration parameters and/or configurable parameter values from configuration files. The incorporation may be via inclusion of API functions of the tracking code base into source code of the target code base, and/or linking of object code associated with the API functions with object code of the target code base.

At block 235, the workload assessment and configuration simulator platform 105 may compile, link, and/or otherwise provide, based on the target code base and the first portion of the tracking code base, the target code base incorporating at least the first portion of the tracking code base to generate a first target executable application for a first computing system environment.

At block 240, the workload assessment and configuration simulator platform 105 may cause execution of the first target executable application on the first computing system environment. During execution of the first target executable application, one or more of the configurable parameter values may be varied over time, for example, via the API functions and/or scripts controlling execution of the first target executable application.

At block 245, the workload assessment and configuration simulator platform 105 may monitor, based on the incorporated first portion of the tracking code base, one or more performance metrics and/or data associated with execution of the first target executable application in relation to one or more configurable parameter values and/or a time point. The various tracked performance metrics and/or events may correspond to one or more layers of an OSI model and/or OSI protocol stack. The various tracked performance metrics and/or events may correspond to one or more of a runtime execution of the first target executable application, one or more other applications with which the first target executable application interfaces and/or communicates, one or more middleware programs, data layer communications, OS layer communications, virtualization processes, bare metal communications, storage communications, and/or networking layer communications. The monitoring may be continuous and/or ongoing, and data determined via the monitoring may be logged and stored in a database (e.g., in the memory 107, in the configuration database 107-3, and/or in the storage device(s) 120) for later analysis by the workload assessment and configuration simulator platform 105. The database may store the monitored data in a multi-dimensional table for multi-dimensional analysis to determine values and/or value ranges for one or more configurable parameters that yield better overall performance metrics. The monitoring may include scanning across each of one or more of a runtime execution of the first target executable application, one or more other applications with which the first target executable application interfaces and/ or communicates, one or more middleware programs, data layer communications, OS layer communications, virtualization processes, bare metal communications, storage communications, and/or networking layer communications. The monitoring may include monitoring one or more system metrics of the first computing system environment in relation to the one or more configurable parameter values and/or a time point. The monitoring may include monitoring one or more computational load statistics and/or error statistics of the first target executable application and/or first computing system environment in relation to the one or more configurable parameter values and/or a time point. The monitoring may include monitoring an executable process processor utilization value in relation to the one or more configurable parameter values and/or time point. The monitoring may include monitoring an executable process memory utilization value in relation to the one or more configurable parameter values and/or time point. The monitoring may include aggregating metadata produced by the first target executable application and/or incorporated tracking API functions, configuration parameter settings and values over time, performance metrics over time, a scoring mechanism or processing of the configuration parameter settings and values, and/or analytics data associated with the performance metrics and/or configuration parameter settings and values. The scoring mechanism may determine that measured performance metrics at a given time are very good, and therefore, assign high scores to configuration parameter values at that moment in time. Likewise, when measured performance metrics are not very good, the scoring mechanism may assign low scores to configuration parameter values at that moment. The scores assigned by the scoring mechanism may be utilized in an optimization algorithm to identify combinations or sets of component parameter values that result in an overall high score and/or overall high level of performance of the executable application. Different configurable parameters may be assigned different weighting values for the analysis and/or optimization algorithm, for example, based upon their anticipated or determined impact upon various monitored performance characteristics and/or values. The weighting values may be used in conjunction with the scores as part of the analysis and optimization process.

In conjunction with the monitoring, the workload assessment and configuration simulator platform 105 may compare the data determined by the monitoring with defined policies and templates that specify normal or expected ranges for the data under various configuration setting values and/or operating conditions of the first target executable application and/or first computing system environment. The workload assessment and configuration simulator platform 105 may flag any deviations from the specified normal or expected ranges for the data for special consideration during a configuration parameter value optimization process and/or for immediate review and/or intervention. For example, certain deviations (e.g., for certain performance levels and/or configuration setting values) may be indicated to represent trigger conditions, warning conditions, and/or error conditions in policies and templates associated with execution of the first target executable application. The policies and templates associated with execution of the first target executable application may also indicate interventions to be taken in the event of certain trigger conditions, warning conditions, and/or error conditions, for example, modifications of configuration parameter values, shutdown and/or resetting of the execution of the executable application, notifying an administrative function of an imminent error or failure associated with the executable application, etc.

At block 247, a determination may be made regarding whether a predetermined sufficient quantity of data has been logged and stored from the monitoring of one or more performance metrics and/or data associated with execution of the first target executable application at block 245 to trigger performance of analyses. A sufficient quantity of data may be preset as a trigger for performing analyses to determine optimal configurable parameter values.

Characteristics of the stored data may also be considered in determining whether a sufficient quantity of data has been stored. For example, a predetermined quantity of data for one or more different configuration values, application performance metrics, and/or performance metrics of the first computing system environment may be specified to be collected prior to a sufficient quantity of data being determined to have been stored to trigger performance of analyses. The predetermined sufficient quantity of data may be associated with requirements of analysis techniques and/or optimization techniques to be performed on the stored data. The workload assessment and configuration simulator platform 105 may be configured to monitor and store data associated with each of a quantity of time periods, for example, Monday morning, the morning of every weekday, the morning of every weekend day, the afternoon of every day of the week, the evening of every day of the week, late night of every day of the week, and/or any one or more time windows within the calendar year. The workload assessment and configuration simulator platform 105 may be configured to monitor and store data associated with each of a quantity of different computing system environment workload levels (e.g., high workload, medium workload, low workload, etc.). For example, a predetermined quantity of data for one or more different predetermined sets of configuration setting values, associated application performance metrics, and/or associated performance metrics of the first computing system environment may be specified to be collected prior to a sufficient quantity of data being determined to have been stored to trigger performance of analyses.

If a sufficient quantity of data is determined to have been stored, the process flow may proceed to block 250. If a sufficient quantity of data is determined to not have been stored, the process flow may return to block 245.

At block 250, the workload assessment and configuration simulator platform 105 may perform computational optimization, for example, using multidimensional optimization, polynomial optimization, artificial intelligence, and/or machine learning techniques, of one or more configurable parameters to generate one or more model sets of the one or more configurable parameter values that correlate to best value for one or more of the one or more performance metrics. The one or more model sets may each be generated by performing computational optimization of one or more configurable parameters based on a different set of the monitored performance metrics. The one or more configurable parameters that are optimized may be predetermined or selected based on one or more characteristics, for example, percentage or quantity of variation in logged monitored data, impact upon one or more performance metrics as determined from the logged monitored data, or according to a predetermined setting or selection. The computational optimization may include model scoring and/or efficiency simulation of the monitored and logged configurable parameters and values. The workload assessment and configuration simulator platform 105 may determine, based on analysis of the stored data, one or more bottlenecks in the computing system environment. Different configurable parameters and/or performance metrics may be assigned different weighting values, for example, based upon their relative importance or significance to the performance of the executable application. The assigned weighting values may be associated with templates and/or simulation models for the executable application. The workload assessment and configuration simulator platform 105 may determine interdependencies between two or more of the one or more configurable parameters based on the stored monitored performance metrics. The workload assessment and configuration simulator platform 105 may determine interdependencies between one or more of the system metrics of the first computing system environment and one or more of the configurable parameters based on the stored monitored performance metrics. The workload assessment and configuration simulator platform 105 may determine interdependencies between one or more computational load statistics and/or error statistics of the first target executable application and/or first computing system environment and one or more of the configurable parameters based on the stored monitored performance metrics.

At block 255, the workload assessment and configuration simulator platform 105 may incorporate at least a second portion of the tracking code base into a migrated code base. The migrated code base may be based on the target code base and modified for compiling, linking, and/or execution on the second computing system environment. The tracking code base may include features to output performance parameters to performance logs and/or input configurable parameters and/or configurable parameter values from configuration files. The incorporation may be via inclusion of API functions of the tracking code base into source code of the migrated code base, and/or linking of object code associated with the API functions with object code of the migrated code base.

At block 260, the workload assessment and configuration simulator platform 105 may compile, link, or otherwise provide, based on the migrated code base and a second portion of the tracking code base, the migrated code base incorporating at least the second portion of the tracking code base to generate a second target (e.g., migrated) executable application for a second computing system environment. Generation of the second target executable application may include preparing the second target executable application for simulation in a simulated environment of the second computing system according to one or more configuration models. The simulations may be performed under the control of scripts or other computer programs (e.g., written in Perl, Java, Python, and/or other computer programming/scripting languages). Different configuration models may be configured to optimize different sets of configurable parameters and/or for different performance metrics. The different configuration models may assign different configurable parameters and/or performance metrics different weighting values, for example, based upon their relative importance or significance to the performance of the executable application.

At block 265, the workload assessment and configuration simulator platform 105 may simulate execution of the second target executable application based on the one or more model sets of the one or more configurable parameter values based on a virtual model of the second computing system environment. The workload assessment and configuration simulator platform 105 may generate one or more scripts to be dynamically executed for performing the simulation of the second target executable application. The one or more scripts may be based on one or more model sets of configuration parameter values. The one or more scripts may be based on various defined performance requirements and/or configuration requirements. The simulation may include efficiency simulation of the second target executable application and/or determination of efficiency of the second target executable application based upon the simulation. The simulations may be performed on the second computing system environment or another computing system environment (e.g., a virtual computing system environment) based on the dynamic scripts as batch processes. The simulations may be performed on the second computing system environment or another computing system environment as an interactive process in communication with the workload assessment and configuration simulator platform 105. When performed as batch processes, the behavior of the simulations may be monitored and logged during their operation, and the simulations may complete when the script controlling the simulations completes. When performed as interactive processes, the simulations may have one or more configuration parameter values modified on the fly based on monitored performance metrics during the course of the simulations.

At block 270, the workload assessment and configuration simulator platform 105 may monitor, based on the incorporated second portion of the tracking code base, one or more performance metrics, events, and/or data associate with simulated execution of the second target executable application in relation to the one or more configurable parameter values and/or a time point. The monitored performance metrics and/or events may correspond to one or more layers of an OSI model and/or OSI protocol stack. In relation to the simulated execution of the second target executable application on a second computing system environment, the monitoring may be performed on one or more of a runtime execution of the second target executable application, one or more other applications with which the second target executable application interfaces and/or communicates, one or more middleware programs, data layer communications, OS layer communications, virtualization processes, bare metal communications, storage communications, and/or networking layer communications. The output and/or performance of the batch processes controlled by the dynamic scripts at block 265 may be monitored and logged. The monitoring may be continuous and/or ongoing, and data determined via the monitoring may be logged and stored in a database (e.g., in the memory 107, in the configuration database 107-3, and/or in the storage device(s) 120) for later analysis by the workload assessment and configuration simulator platform 105. The database may store the monitored data in a multi-dimensional table for multi-dimensional analysis to determine values and/or value ranges for one or more configurable parameters that yield better overall performance metrics. The monitoring may include monitoring one or more system metrics of the second computing system environment associated with the simulation, in relation to the one or more configurable parameter values and/or a time point. The monitoring may include monitoring one or more computational load statistics and/or error statistics of the second target executable application and/or second computing system environment associated with the simulation in relation to the one or more configurable parameter values and/or a time point. The monitoring may include monitoring an executable process processor utilization value in relation to the one or more configurable parameter values and/or time point. The monitoring may include monitoring an executable process memory utilization value in relation to the one or more configurable parameter values and/or time point. The monitoring may include aggregating metadata produced by the simulated second target executable application and/or incorporated tracking API functions, configuration parameter settings and values over time, performance metrics over time, a scoring mechanism or processing of the configuration parameter settings and values, and/or analytics data associated with the performance metrics and/or configuration parameter settings and values.

In conjunction with the monitoring, the workload assessment and configuration simulator platform 105 may compare the data determined by the monitoring with simulation templates and/or scripts associated with the one or more model sets that specify normal or expected ranges for the data under various configuration setting values and/or operating conditions of the simulated second target executable application and/or associated second computing system environment. The workload assessment and configuration simulator platform 105 may flag any deviations from the specified normal or expected ranges for the data for special consideration during a configuration parameter value optimization process and/or ranking and selection of a model set for deployment with the migrated executable application on the second computing system environment. For example, certain deviations (e.g., for certain performance levels and/or configuration setting values) may be indicated to represent trigger conditions, warning conditions, and/or error conditions associated with simulation of the second target executable application. Based on the stored data of the monitored simulation, the workload assessment and configuration simulator platform 105 may determine one or more interventions to be taken in the event of certain trigger conditions, warning conditions, and/or error conditions, for example, modifications of configuration parameter values, shutdown and/or resetting of the execution of the executable application, notifying an administrative function of an imminent error or failure associated with the executable application, etc. The indications of the target conditions, warning conditions, and/or error conditions, as well as the determined one or more interventions, may be stored in conjunction with the associated model set.

At block 273, a determination may be made regarding whether a predetermined sufficient quantity of data has been logged and stored from the monitoring of one or more performance metrics and/or data associated with execution of the simulated second target executable application at block 270 to trigger performance of analyses. A sufficient quantity of data may be preset as a trigger for performing analyses to determine optimal configurable parameter values. Characteristics of the stored data may also be considered in determining whether a sufficient quantity of data has been stored. For example, a predetermined quantity of data for one or more different configuration values, application performance metrics, and/or performance metrics of the second computing system environment associated with the simulation may be specified to be collected prior to a sufficient quantity of data being determined to have been stored to trigger performance of analyses. The predetermined sufficient quantity of data may be associated with requirements of analysis techniques and/or optimization techniques to be performed on the stored data. If a sufficient quantity of data is determined to have been stored, the process flow may proceed to block 275. If a sufficient quantity of data is determined to not have been stored, the process flow may return to block 270.

At block 275, the workload assessment and configuration simulator platform 105 may perform computational optimization, for example, using multidimensional optimization, polynomial optimization, artificial intelligence, and/or machine learning techniques, of one or more configurable parameters to identify one or more performance levels according to one or more performance metrics for one or more model sets of the one or more configurable parameter values. The one or more configurable parameters that are optimized may be predetermined or selected based on one or more characteristics, for example, percentage or quantity of variation in logged monitored data, impact upon one or more performance metrics as determined from the logged monitored data, or according to a predetermined setting or selection. Different configurable parameters and/or performance metrics may be assigned different weighting values, for example, based upon their relative importance or significance to the performance of the executable application. The assigned weighting values may be associated with templates and/or the one or more model sets.

The computational optimization may also identify a best performing model set of the one or more model sets of the one or more configurable parameter values that correlate to best value for one or more of the one or more performance metrics. Acceptable ranges for each of the one or more model sets of the one or more configurable parameter values that correlate to a best value for one or more of the one or more performance metrics may be determined, for example, based on the computational optimization, for example, the multidimensional optimization, polynomial optimization, artificial intelligence, and/or machine learning techniques. The workload assessment and configuration simulator platform 105 may determine and/or utilize the determined interdependencies between two or more of the one or more configurable parameters and/or between one or more of the system metrics and one or more of the configurable parameters. The workload assessment and configuration simulator platform 105 may determine and/or utilized the determined interdependencies between two or more of the one or more configurable parameters and/or between one or more of the computational load statistics and/or error statistics of the second target executable application and/or second computing system environment and one or more of the configurable parameters based on the stored monitored performance metrics. The determined interdependencies may be utilized by the computational optimization, for example, the multidimensional optimization, polynomial optimization, artificial intelligence, and/or machine learning techniques, in determining one or more best performing model set of the one or more model sets of the one or more configurable parameter values that correlate to best value for one or more of the one or more performance metrics. The computational optimization may apply a determined weighting value to each of a plurality of layers of a monitored OSI model and/or OSI protocol stack as part of the determination of the best model.

At block 280, the workload assessment and configuration simulator platform 105 may deploy the second target executable application on the second computing system environment using the best performing model set of the one or more model sets of the one or more configurable parameter values. The deployed second target executable application may comprise the second portion of the tracking code base to facilitate tracking and logging of configuration parameter values and/or operational performance of the second target executable application and/or the second computing system environment.

At block 285, the workload assessment and configuration simulator platform 105 may monitor, based on the incorporated second portion of the tracking code base, one or more performance metrics, events, and/or data associated with execution of the deployed second target executable application on the second computing system environment in relation to the one or more configurable parameter values and/or time point. The various monitored performance metrics and/or events may correspond to one or more layers of an OSI model and/or OSI protocol stack. Monitoring may be performed on one or more of a runtime execution of the first target executable application, one or more other applications with which the first target executable application interfaces and/or communicates, one or more middleware programs, data layer communications, OS layer communications, virtualization processes, bare metal communications, storage communications, and/or networking layer communications. The monitoring may include monitoring one or more system metrics of the second computing system environment in relation to the one or more configurable parameter values and/or a time point. The monitoring may include monitoring one or more computational load statistics and/or error statistics of the second target executable application and/or second computing system environment in relation to the one or more configurable parameter values and/or a time point. The monitoring of the performance metrics and/or data associated with execution of the deployed second target executable application may be based on the one or more performance metrics of the simulated second target executable application and/or the one or more performance metrics of the first target executable application on the first computing system environment. The monitoring may include monitoring an executable process processor utilization value in relation to the one or more configurable parameter values and/or time point. The monitoring may include monitoring an executable process memory utilization value in relation to the one or more configurable parameter values and/or time point. The monitoring may include aggregating metadata produced by the second target executable application and/or incorporated tracking API functions, configuration parameter settings and values over time, performance metrics over time, a scoring mechanism or processing of the configuration parameter settings and values, and/or analytics data associated with the performance metrics and/or configuration parameter settings and values. The monitoring may be continuous and/or ongoing, and data determined via the monitoring may be logged and stored in a database (e.g., in the memory 107, in the configuration database 107-3, and/or in the storage device(s) 120) for later analysis by the workload assessment and configuration simulator platform 105. The database may store the monitored data in a multi-dimensional table for multi-dimensional analysis to determine values and/or value ranges for one or more configurable parameters that yield better overall performance metrics.

At block 287, the workload assessment and configuration simulator platform 105 may analyze the logged and stored data from the monitoring of block 285 and determine if a predetermined trigger operating condition of the second target executable application executing on the second computing system environment is recognized. The predetermined trigger operating condition may include a precursor to an error condition. The predetermined trigger operating condition of the second target executable application may be predetermined based on the data stored from monitoring of the first target executable application executing on the first computing system environment at block 245. The predetermined trigger operating condition of the second target executable application may be predetermined based on the data stored from monitoring of the simulations of the second target executable application. If the trigger condition is recognized, the process flow may continue to block 290. If the trigger condition is not recognized, monitoring may continue at block 285.

At block 290, the workload assessment and configuration simulator platform 105 may determine a modification to the one or more configurable parameter values for the deployed second target executable application on the second computing system environment. The modification may be determined to be able to improve performance of the second target executable application executing on the second computing system environment and/or to prevent the recognized trigger condition and/or error condition from occurring. The determination may be based on analysis of operational conditions leading to the predetermined trigger operating condition and/or the error condition recognized from monitored data logged and stored at block 285. The workload assessment and configuration simulator platform 105 may determine that shutdown and/or resetting of the execution of the executable application, notifying an administrative function of an imminent error or failure associated with the executable application, and/or other action may be appropriate actions to be taken based on the trigger condition recognized at block 287.

At block 295, the workload assessment and configuration simulator platform 105 may modify the one or more configurable parameter values for the deployed second target executable application on the second computing system environment. The modification may be based on the determined modification of block 290. The workload assessment and configuration simulator platform 105 may shutdown and/or reset the execution of the executable application, notify an administrative function of an imminent error or failure associated with the executable application, and/or take other action determined at block 290 and based on the trigger condition recognized at block 287.

In an exemplary arrangement, a standalone application may have a maximum user request queue length configuration setting value of 10, for example, based on performance limitations of the computing system and/or deployed executable application. When the standalone application is migrated to a cloud environment, the maximum user request queue length configuration setting value may be copied over from the standalone computing system environment to the cloud computing system environment. The migrated application in the cloud environment may reject an $11^{th}$ user request when there are already 10 user requests in the queue. However, the migrated application in the cloud environment may be capable of supporting a longer user request queue if the maximum user request queue length configuration setting value were set to be larger, for example, 100. Via performance of the process flow described with reference to FIG. 2 herein, a new maximum user request queue length configuration setting value may be determined and deployed with the migrated application in the cloud environment. The new determined maximum user request queue length configuration setting value for the migrated application in the cloud environment may reduce a bottleneck to improve processing throughput and application responsiveness and performance based on an analysis of the computational requirements and capabilities associated with the migrated application in the cloud environment.

Continuing to refer to the exemplary arrangement above, varying computational loads on the cloud environment may lead to a varying maximum user request queue length configuration setting value that improves processing throughput and application responsiveness and performance in the migrated application executing in the cloud environment. The cloud environment's computational loads may vary due to a varying quantity of users and/or executable applications sharing the cloud environment's computational and network communications resources. Therefore, a single fixed value for the maximum user request queue length configuration setting may not provide a desired level of performance at all times and in all operating conditions. In some operating conditions of the migrated application in the cloud environment at some points in time, a value of 100 may be optimal, while in other operating conditions of the migrated application in the cloud environment at other points in the time, a value of 15 may be optimal, for example. Via performance of the process flow described with reference to FIG. 2 herein, new maximum user request queue length configuration setting values may be periodically determined and deployed with the migrated application in the cloud environment, on-demand and/or in response to changes in computational and/or network communications loads on the cloud environment. The periodically determined maximum user request queue length configuration setting values for the migrated application in the cloud environment may reduce a bottleneck to improve processing throughput and application responsiveness and performance based on periodic and/or triggered analyses of the computational requirements and capabilities associated with the migrated application in the cloud environment, as well as current computational and network communications loads on the cloud environment. A dynamic queue length that corresponds to a current response time of the migrated application in the cloud environment may facilitate efficiently processing as many requests as possible without causing a degradation in performance for the requests being processed. Likewise, for any configuration parameter of the migrated executable application and/or computing system on which the migrated application executes, a dynamic value that corresponds to a current response time and/or other performance metrics of the migrated application in the computing system environment on which the migrated application executes, may facilitate efficiently processing as many operations as possible without causing a degradation in performance for the operations being processed.

In an exemplary arrangement, a bottleneck (e.g., declining performance, rising queue length, request rejections, etc.) in the executable application's process flow and/or performance may result, for example, due to current operating conditions in the computing system environment in which the executable application operates. The monitored and stored performance metrics may include data (e.g., metadata, performance statistics, etc.) identifying and/or pertaining to a plurality of different functions, modules, and/or components of the executable application and/or computing system environment. The data may also include a snapshot of all configuration setting values of the executable application and/or computing system environment at the time point associated with the stored performance metrics. In response to detecting the bottleneck, for example, as the trigger condition in block 287 as discussed above, the stored data may be analyzed to determine one or more functions, modules, and/or components associated with and/or causing the bottleneck. The analysis may be performed, for example, as part of the analysis of block 290 discussed above. Corrective action to remove the bottleneck, for example, changing a maximum user request queue length configuration setting value, may be determined at block 290 and deployed at block 295 of the process flow of FIG. 2. Other configuration parameter values that may be analyzed and modified may include a quantity of data storage reserved for use by the executable application, a quantity of memory reserved for use by the executable application, policies for recycling memory used by the executable application, specifications for restarting and/or resetting the executable application to a default state, specification of one or more servers associated with the executable application and/or computing system environment on which the application executes, a maximum cache size of a processor on which the application executes, a maximum file size to be stored and/or accessed by the executable application, etc.

In an exemplary arrangement, the analyses performed, for example, at any of blocks 250, 275, and 290, may correlate different types of requests processed and/or operations performed by the executable application with different response times and/or performance metrics of the executable application and/or computing system on which the application executes. Monitored performance metrics may be determined to be dependent on the types of requests processed and/or operations performed by the executable application. Therefore, configuration parameter values may be set based on the types of requests processed and/or operations performed by the executable application. For example, a configuration parameter value may be set based on a percentage of and/or a quantity of a certain type of request processed and/or operation performed by the executable application out of all requests processed and/or operations performed by the executable application within a specified period of time. Modifications to the configuration parameter values determined at block 290 and deployed at block 295 may be based on a quantity or percentage of requests and/or operations of one or more different types that are being processed and/or performed by the executable application at any given time.

In an exemplary arrangement, a first computing system may generate, based on a target code base, based on at least a first portion of a tracking code base, and/or based on a second computing system, a target application configured for execution on the second computing system. The first computing system may cause execution, based on a first set of configuration parameter values, of the target application on the second computing system. The first computing system may monitor, based on the first portion of the tracking code base, one or more performance metrics of the target application executing on the second computing system. The first computing system may determine, based on the first set of configuration parameter values and/or based on the monitored one or more performance metrics, one or more second sets of configuration parameter values. The first computing system may generate, based on a migrated code base, based on at least a second portion of the tracking code base, and/or based on a third computing system, a migrated application configured for execution on the third computing system. The first computing system may cause execution, based on the determined one or more second sets of configuration parameter values, of the migrated application on the third computing system. The first computing system may determine the one or more second sets of configuration parameter values by performing computational optimization, based on the first set of configuration parameter values and/or based on the monitored one or more performance metrics, of one or more associated configuration parameters. The first computing system may determine a third set of configuration parameter values by performing computational optimization, based on the one or more second sets of configuration parameter values, and/or based on monitored one or more performance metrics of respective simulations of the migrated application on the third computing system using the one or more second sets of configuration parameter values. Execution of the migrated application on the third computing system may also be based on the determined third set of configuration parameter values. The first computing system may monitor, based on the first portion of the tracking code base, one or more performance metrics of a plurality of layers of an OSI stack associated with execution of the target application on the second computing system. The first computing system may determine, based on the first set of configuration parameter values and/or based on the monitored one or more performance metrics of the plurality of layers of the OSI stack, the one or more second sets of configuration parameter values. The first computing system may monitor, based on the second portion of the tracking code base, one or more performance metrics of the migrated application on the third computing system. The first computing system may determine, based on the monitored one or more performance metrics of the migrated application on the third computing system, a third set of configuration parameter values. The first computing system may modify configuration, based on the determined third set of configuration parameter values, of the migrated application on the third computing system.

In an exemplary arrangement, a first computing system may generate, based on a target code base, based on a tracking code base, and/or based on the third computing system, a target application configured for execution on the third computing system. The first computing system may cause execution, based on a second set of configuration parameter values, of the target application on the third computing system. The first computing system may monitor, based on the tracking code base, one or more performance metrics of the target application executing on the third computing system. The first computing system may determine, based on the second set of configuration parameter values and/or based on the monitored one or more performance metrics, a third set of configuration parameter values. The first computing system may modify configuration, based on the determined third set of configuration parameter values, of the target application on the third computing system. The third computing system may execute, based on the second set of configuration parameter values, the target application. A second computing system may execute, based on a first set of configuration parameter values, a target application configured for execution on the second computing system. The second set of configuration parameter values may be based on monitored one or more performance metrics of the target application executed on the second computing system and configured based on the first set of configuration parameter values. The first computing system may determine the second set of configuration parameter values by performing computational optimization, based on monitored one or more performance metrics of simulations of the target application configured for execution on the third computing system, of the second set of configuration parameter values. The first computing system may cause performance of simulations of the target application configured for execution on the third computing system based on a plurality of different sets of configuration parameter values. The first computing system may monitor one or more performance metrics of a plurality of layers of an OSI stack associated with the simulations of the target application. The first computing system may determine the second set of configuration parameter values by performing computational optimization, based on the monitored one or more performance metrics of the plurality of layers of the OSI stack associated with the simulations of the target application and based on the plurality of different sets of configuration parameter values, of the second set of configuration parameter values. The first computing system may monitor one or more performance metrics of a plurality of layers of an OSI stack associated with the execution of the target application on the third computing system. The first computing system may determine the third set of configuration parameter values by performing computational optimization, based on the monitored one or more performance metrics and/or based on the second set of configuration parameter values, of the third set of configuration parameter values.

In an exemplary arrangement, a first computing system may generate, based on a target code base, based on a tracking code base, and/or based on a third computing system, a target application configured for execution on a third computing system. The first computing system may generate, based on a log of monitored performance metrics and associated configuration parameter values, a first set of configuration parameter values and a second set of configuration parameter values, for simulation of the target application configured for execution on the third computing system. The first computing system may cause execution, based on the first set of configuration parameter values, of a first simulation of the target application configured for execution on the third computing system. The first computing system may cause execution, based on the second set of configuration parameter values, of a second simulation of the target application configured for execution on the third computing system. The first computing system may monitor, based on the tracking code base, one or more performance metrics of the first simulation of the target application. The first computing system may monitor, based on the tracking code base, one or more performance metrics of the second simulation of the target application. The first computing system may determine, based on the first set of configuration parameter values, based on the monitored one or more performance metrics of the first simulation of the target application, based on the second set of configuration parameter values, and/or based on the monitored one or more performance metrics of the second simulation of the target application, a third set of configuration parameter values. The first computing system may cause execution, based on the determined third set of configuration parameter values, of the target application on the third computing system. The first computing system may determine the third set of configuration parameter values by performing computational optimization, based on the first set of configuration parameter values, based on the monitored one or more performance metrics of the first simulation of the target application, based on the second set of configuration parameter values, and/or based on the monitored one or more performance metrics of the second simulation of the target application, of the third set of configuration parameter values. The first computing system may monitor one or more performance metrics of a plurality of layers of an OSI stack associated with the simulations of the target application. The first computing system may monitor, based on the tracking code base, one or more performance metrics of a plurality of layers of an OSI stack associated with the first simulation of the target application. The first computing system may monitor, based on the tracking code base, one or more performance metrics of a plurality of layers of an OSI stack associated with the second simulation of the target application. The first computing system may determine, based on the first set of configuration parameter values, based on the monitored one or more performance metrics of the plurality of layers of the OSI stack associated with the first simulation of the target application, based on the second set of configuration parameter values, and/or based on the monitored one or more performance metrics of the plurality of layers of the OSI stack associated with the second simulation of the target application, the third set of configuration parameter values. The first computing system may monitor one or more performance metrics of a plurality of layers of an OSI stack associated with the execution of the target application on the third computing system. The first computing system may determine a fourth set of configuration parameter values by performing computational optimization, based on the monitored one or more performance metrics of the plurality of layers of the OSI stack associated with the execution of the target application on the third computing system and/or based on the third set of configuration parameter values, of the fourth set of configuration parameter values. The first computing system may modify configuration, based on the determined fourth set of configuration parameter values, of the target application on the third computing system. The first computing system may monitor the performance metrics of an executable application on a second computing system configured based on the associated configuration parameter values. The first computing system may log the monitored performance metrics associated with the configuration parameter values. The target application configured for execution on the third computing system may be migrated from the executable application on the second computing system.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various examples. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware example, an entirely software example, an entirely firmware example, or an example combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may comprise one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, one or more of the computing system environments discussed above may be combined into a single computing system environment, and the various functions of each computing system environment may be performed by the single computing system environment. In such arrangements, any and/or all of the above-discussed communications between computing system environments may correspond to data being accessed, moved, modified, updated, and/or otherwise used by the single computing system environment. Additionally, or alternatively, one or more of the computing system environments discussed above may be implemented in one or more virtual machines that are provided by one or more physical computing devices. In such arrangements, the various functions of each computing system environment may be performed by the one or more virtual machines, and any and/or all of the above-discussed communications between computing system environments may correspond to data being accessed, moved, modified, updated, and/or otherwise used by the one or more virtual machines.

Aspects of the disclosure have been described in terms of illustrative examples thereof. Numerous other examples, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A first computing system, comprising:
   at least one first processor;
   a first communication interface communicatively coupled to the at least one first processor; and
   a first memory storing computer-readable instructions that, when executed by the at least one first processor, cause the first computing system to:
   generate, based on a target code base, based on at least a first portion of a tracking code base, and based on a second computing system, a target application configured for execution on the second computing system;
   cause execution, based on a first set of configuration parameter values, of the target application on the second computing system;
   monitor, based on the first portion of the tracking code base, one or more performance metrics of the target application;
   determine, based on the first set of configuration parameter values and based on the monitored one or more performance metrics, one or more second sets of configuration parameter values;
   generate, based on a migrated code base, based on at least a second portion of the tracking code base, and based on a third computing system, a migrated application configured for execution on the third computing system; and
   cause execution, based on the determined one or more second sets of configuration parameter values, of the migrated application on the third computing system.

2. The first computing system of claim 1, wherein the first memory further stores computer-readable instructions that, when executed by the at least one first processor, cause the first computing system to:
   determine the one or more second sets of configuration parameter values by performing computational optimization, based on the first set of configuration parameter values and based on the monitored one or more performance metrics, of one or more associated configuration parameters.

3. The first computing system of claim 1, wherein the first memory further stores computer-readable instructions that, when executed by the at least one first processor, cause the first computing system to:
   determine a third set of configuration parameter values by performing computational optimization, based on the one or more second sets of configuration parameter values, and based on monitored one or more performance metrics of respective simulations of the migrated application on the third computing system using the one or more second sets of configuration parameter values; and
   wherein execution of the migrated application on the third computing system is also based on the determined third set of configuration parameter values.

4. The first computing system of claim 1, wherein the first memory further stores computer-readable instructions that, when executed by the at least one first processor, cause the first computing system to:
   monitor, based on the first portion of the tracking code base, one or more performance metrics of a plurality of layers of an OSI stack associated with execution of the target application on the second computing system; and
   determine, based on the first set of configuration parameter values and based on the monitored one or more performance metrics of the plurality of layers of the OSI stack, the one or more second sets of configuration parameter values.

5. The first computing system of claim 1, wherein the first memory further stores computer-readable instructions that, when executed by the at least one first processor, cause the first computing system to:
   monitor, based on the second portion of the tracking code base, one or more performance metrics of the migrated application on the third computing system;
   determine, based on the monitored one or more performance metrics of the migrated application on the third computing system, a third set of configuration parameter values; and
   modify configuration, based on the determined third set of configuration parameter values, of the migrated application on the third computing system.

6. A system comprising:
   a first computing system, comprising:
      at least one first processor;
      a first communication interface communicatively coupled to the at least one first processor; and
      a first memory storing computer-readable instructions executable by the at least one first processor; and
   a third computing system, comprising:
      a third communication interface communicatively coupled to at least one third processor; and
      a third memory storing computer-readable instructions executable by the at least one third processor;
   wherein the first memory stores computer-readable instructions that, when executed by the at least one first processor, cause the first computing system to:

generate, based on a target code base, based on a tracking code base, and based on the third computing system, a target application configured for execution on the third computing system;

cause execution, based on a second set of configuration parameter values, of the target application on the third computing system;

monitor, based on the tracking code base, one or more performance metrics of the target application executing on the third computing system;

determine, based on the second set of configuration parameter values and based on the monitored one or more performance metrics, a third set of configuration parameter values; and modify configuration, based on the determined third set of configuration parameter values, of the target application on the third computing system; and wherein the third memory stores computer-readable instructions that, when executed by the at least one third processor, cause the third computing system to:

execute, based on the second set of configuration parameter values, the target application.

7. The system of claim 6, further comprising a second computing system comprising:

at least one second processor;

a second communication interface communicatively coupled to the at least one second processor; and a second memory storing computer-readable instructions that, when executed by the at least one second processor, cause the second computing system to:

execute, based on a first set of configuration parameter values, a target application configured for execution on the second computing system;

wherein the second set of configuration parameter values is based on monitored one or more performance metrics of the target application executed on the second computing system and configured based on the first set of configuration parameter values.

8. The system of claim 6, wherein the first memory further stores computer-readable instructions that, when executed by the at least one first processor, cause the first computing system to:

determine the second set of configuration parameter values by performing computational optimization, based on monitored one or more performance metrics of simulations of the target application configured for execution on the third computing system, of the second set of configuration parameter values.

9. The system of claim 6, wherein the first memory further stores computer-readable instructions that, when executed by the at least one first processor, cause the first computing system to:

cause performance of simulations of the target application configured for execution on the third computing system based on a plurality of different sets of configuration parameter values;

monitor one or more performance metrics of a plurality of layers of an OSI stack associated with the simulations of the target application; and determine the second set of configuration parameter values by performing computational optimization, based on the monitored one or more performance metrics of the plurality of layers of the OSI stack associated with the simulations of the target application and based on the plurality of different sets of configuration parameter values, of the second set of configuration parameter values.

10. The system of claim 6, wherein the first memory further stores computer-readable instructions that, when executed by the at least one first processor, cause the first computing system to:

monitor one or more performance metrics of a plurality of layers of an OSI stack associated with the execution of the target application on the third computing system; and determine the third set of configuration parameter values by performing computational optimization, based on the monitored one or more performance metrics and based on the second set of configuration parameter values, of the third set of configuration parameter values.

11. A non-transitory computer-readable medium storing instructions that, when executed, cause performance of:

generating, by a first computing system, based on a target code base, based on a tracking code base, and based on a third computing system, a target application configured for execution on a third computing system;

generating, by the first computing system, based on a log of monitored performance metrics and associated configuration parameter values, a first set of configuration parameter values and a second set of configuration parameter values, for simulation of the target application configured for execution on the third computing system;

causing execution, based on the first set of configuration parameter values, of a first simulation of the target application configured for execution on the third computing system;

causing execution, based on the second set of configuration parameter values, of a second simulation of the target application configured for execution on the third computing system;

monitoring, based on the tracking code base, one or more performance metrics of the first simulation of the target application;

monitoring, based on the tracking code base, one or more performance metrics of the second simulation of the target application;

determining, by the first computing system, based on the first set of configuration parameter values, based on the monitored one or more performance metrics of the first simulation of the target application, based on the second set of configuration parameter values, and based on the monitored one or more performance metrics of the second simulation of the target application, a third set of configuration parameter values; and causing execution, based on the determined third set of configuration parameter values, of the target application on the third computing system.

12. The medium of claim 11, further comprising instructions that, when executed, cause performance of:

determining the third set of configuration parameter values by performing computational optimization, based on the first set of configuration parameter values, based on the monitored one or more performance metrics of the first simulation of the target application, based on the second set of configuration parameter values, and based on the monitored one or more performance metrics of the second simulation of the target application, a third set of configuration parameter values.

13. The medium of claim 11, further comprising instructions that, when executed, cause performance of:

monitoring one or more performance metrics of a plurality of layers of an OSI stack associated with the simulations of the target application; and monitoring, based on the tracking code base, one or more performance metrics of a plurality of layers of an OSI stack associated with the first simulation of the target application;

monitoring, based on the tracking code base, one or more performance metrics of a plurality of layers of an OSI stack associated with the second simulation of the target application; and determining, by the first computing system, based on the first set of configuration parameter values, based on the monitored one or more performance metrics of the plurality of layers of the OSI stack associated with the first simulation of the target application, based on the second set of configuration parameter values, and based on the monitored one or more performance metrics of the plurality of layers of the OSI stack associated with the second simulation of the target application, the third set of configuration parameter values.

14. The medium of claim 11, further comprising instructions that, when executed, cause performance of:

monitoring one or more performance metrics of a plurality of layers of an OSI stack associated with the execution of the target application on the third computing system;

determining a fourth set of configuration parameter values by performing computational optimization, based on the monitored one or more performance metrics of the plurality of layers of the OSI stack associated with the execution of the target application on the third computing system and based on the third set of configuration parameter values, of the fourth set of configuration parameter values; and modifying configuration, based on the determined fourth set of configuration parameter values, of the target application on the third computing system.

15. The medium of claim 11, further comprising instructions that, when executed, cause performance of:

monitoring the performance metrics of an executable application on a second computing system configured based on the associated configuration parameter values; and logging the monitored performance metrics associated with the configuration parameter values;

wherein the target application configured for execution on the third computing system is migrated from the executable application on the second computing system.

16. A method comprising:

generating, by a first computing system, based on a target code base, based on at least a first portion of a tracking code base, and based on a second computing system, a target application configured for execution on the second computing system;

causing execution, based on a first set of configuration parameter values, of the target application on the second computing system;

monitoring, based on the first portion of the tracking code base, one or more performance metrics of the target application;

determining, based on the first set of configuration parameter values and based on the monitored one or more performance metrics, one or more second sets of configuration parameter values;

generating, based on a migrated code base, based on at least a second portion of the tracking code base, and based on a third computing system, a migrated application configured for execution on the third computing system; and causing execution, based on the determined one or more second sets of configuration parameter values, of the migrated application on the third computing system.

17. The method of claim 16, further comprising:

determining the one or more second sets of configuration parameter values by performing computational optimization, based on the first set of configuration parameter values and based on the monitored one or more performance metrics, of one or more associated configuration parameters.

18. The method of claim 16, further comprising:

determining a third set of configuration parameter values by performing computational optimization, based on the one or more second sets of configuration parameter values, and based on monitored one or more performance metrics of respective simulations of the migrated application on the third computing system using the one or more second sets of configuration parameter values; and wherein execution of the migrated application on the third computing system is also based on the determined third set of configuration parameter values.

19. The method of claim 16, further comprising:

monitoring, based on the first portion of the tracking code base, one or more performance metrics of a plurality of layers of an OSI stack associated with execution of the target application on the second computing system; and determining, based on the first set of configuration parameter values and based on the monitored one or more performance metrics of the plurality of layers of the OSI stack, the one or more second sets of configuration parameter values.

20. The method of claim 16, further comprising:

monitoring, based on the second portion of the tracking code base, one or more performance metrics of the migrated application on the third computing system;

determining, based on the monitored one or more performance metrics of the migrated application on the third computing system, a third set of configuration parameter values; and modifying configuration, based on the determined third set of configuration parameter values, of the migrated application on the third computing system.

* * * * *